United States Patent
Strater et al.

(10) Patent No.: US 8,159,962 B2
(45) Date of Patent: Apr. 17, 2012

(54) METHOD AND APPARATUS FOR OPTIMIZING HOME NETWORK INTERFACE SELECTION IN HOME NETWORKING APPLICATIONS

(75) Inventors: Jay W. Strater, Jamison, PA (US); Thomas L. Du Breuil, Ivyland, PA (US); Gerald R. Johnson, Cataumet, MA (US)

(73) Assignee: General Instrument Corporation, Horsham, PA (US)

( * ) Notice: Subject to any disclaimer, the term of this patent is extended or adjusted under 35 U.S.C. 154(b) by 242 days.

(21) Appl. No.: 11/829,131

(22) Filed: Jul. 27, 2007

(65) Prior Publication Data

US 2009/0028052 A1    Jan. 29, 2009

(51) Int. Cl.
*G01R 31/08* (2006.01)
*H04L 12/28* (2006.01)
*H04N 7/16* (2011.01)

(52) U.S. Cl. ......... 370/252; 370/401; 725/133; 725/151

(58) Field of Classification Search .......... 370/252, 370/401; 725/151, 133–135
See application file for complete search history.

(56) References Cited

U.S. PATENT DOCUMENTS

| | | | |
|---|---|---|---|
| 2005/0168326 A1* | 8/2005 | White et al. | 340/310.01 |
| 2006/0179149 A1* | 8/2006 | Janning et al. | 709/227 |
| 2006/0251094 A1* | 11/2006 | Van Vleck et al. | 370/419 |
| 2007/0076728 A1 | 4/2007 | Rieger et al. | |
| 2008/0022322 A1* | 1/2008 | Grannan et al. | 725/78 |
| 2008/0022336 A1* | 1/2008 | Howcroft et al. | 725/100 |
| 2008/0310419 A1* | 12/2008 | Bansal et al. | 370/395.6 |

OTHER PUBLICATIONS

PCT Search Report & Written Opinion, Re: Application #PCT/US2008/070806; Oct. 3, 2008.

* cited by examiner

*Primary Examiner* — Ricky Ngo
*Assistant Examiner* — Paul H Masur
(74) *Attorney, Agent, or Firm* — Stewart M. Wiener

(57) ABSTRACT

Embodiments of the invention generally provide a method and apparatus for optimizing home networking interface selection in home networking applications. One embodiment of a method for selecting, at a set top box in a network, an active home networking interface from among a plurality of home networking interfaces includes activating the best performing home networking interface and deactivating the remainder of the home networking interfaces.

15 Claims, 4 Drawing Sheets

METHOD AND APPARATUS FOR OPTIMIZING HOME NETWORK INTERFACE SELECTION IN HOME NETWORKING APPLICATIONS

FIELD OF THE INVENTION

The present invention generally relates to home networking applications, and more particularly relates to multiple systems operator (MSO) and telecom set top boxes having multiple bridged home networking interfaces.

BACKGROUND OF THE INVENTION

Operator internet protocol (IP)-enabled set top box (STB) solutions are moving to provide whole-home IP-STB solutions. FIG. 1, for example, is a block diagram illustrating one embodiment of a home network 100. The home network 100 may be configured, for example, to provide cable, off-air and Internet-based services to a home user. The home network 100 includes a plurality of terminals 102, 104 and 106 that share content via a plurality of physical (e.g., Ethernet) links 108 and logical (e.g., HomePlug AV (HPAV) or Multimedia over Coax Alliance (MoCA)) links $110_1$-$110_n$ (hereinafter collectively referred to as "logical links 110"). The terminals include one or more home routers 102, one or more hubs 104 and one or more clients $106_1$-$106_n$ (hereinafter referred to as "clients 106"). Embodiments of hubs 104 may include, for example, tuners, off-air and cable interfaces and/or hard disks for receiving off-air and cable television, digital video recorder (DVR) and Internet content services. Embodiments of clients 106 may be configured as thin clients that receive streaming content from hubs 104. In addition, hubs 104 may stream content to each other. Other embodiments of clients 106 may contain tuners for off-air and/or cable input for streaming received content to a DVR in a hub 104 and receiving the streamed content back for "trick play" service.

In solutions such as that illustrated, clients STBs are typically expected to have multiple home networking interfaces, including at least one advanced home networking interface (e.g., HPAV or MoCA) that will activate upon installation of the client STB. For example, in FIG. 1, client $106_n$ is connected to the router 102 over a logical link $110_n$. The client STB may further include an Ethernet interface that a user can connect to another home networking device (e.g., a hub STB and/or a home router or switch) at or after initialization. In FIG. 1, client $106_n$ is additionally connected to the router 102 via a physical link $108_n$. Those skilled in the art will appreciate that the architecture illustrated in FIG. 1 is merely one illustrative example of a home network.

Despite the number of home networking interfaces, it is expected that a client STB will only be able to support one active (i.e., available for data communication) home networking interface at a time, since a client STB is an end terminal and thus may not have the processing capacity for bridging between interfaces. As such, a decision must be made as to which one of the potentially numerous home networking interfaces should remain active. This decision is important, because a poor choice can lead to degraded AV streaming, or even isolation of the client STB from other terminals. Thus, it is desirable, if only one home networking interface may be selected to activate, that the best performing home networking interface is selected. Moreover, because a user may update the home network architecture at any time (e.g., by adding devices or connections), even after operator installation, dynamic reevaluation of this choice is often necessary to ensure that the active home networking interface is still the best performing home networking interface. Selecting the one home networking interface that performs better than all others may be very difficult when faced with a plurality of candidate home networking interfaces, however (especially in the case of a large home network which may have many home networking interfaces).

Therefore, there is a need in the art for a method and apparatus for optimizing home network interface selection in home networking applications.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Embodiments of the invention generally provide a method and apparatus for optimizing home network interface selection in home networking applications. The present invention allows for the selection of an active home networking interface at a client set top box (STB) from among a plurality of candidate home networking interfaces, where the selected home networking interface provides optimal performance relative to those home networking interfaces not selected. An active or activated home networking interface, as described herein, is a home networking interface that is available for data communication, including Internet traffic, AV streaming traffic, and the like.

Figure 1:
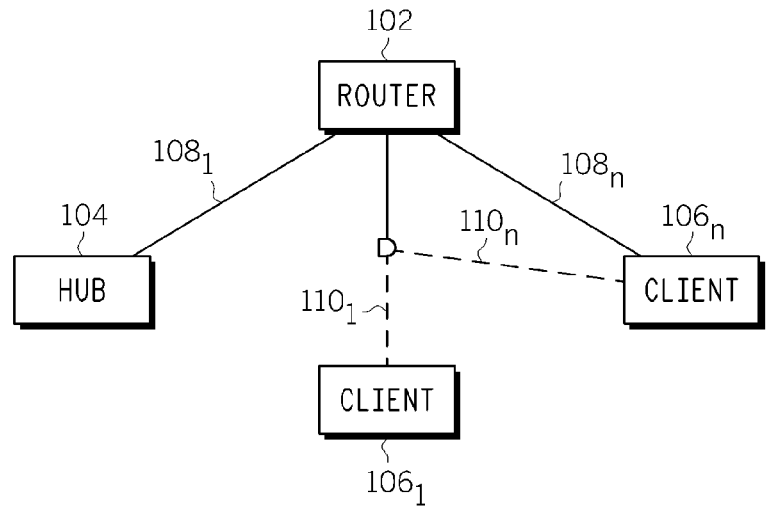
FIG. 1 is a block diagram illustrating one embodiment of a home network.
Figure 2:
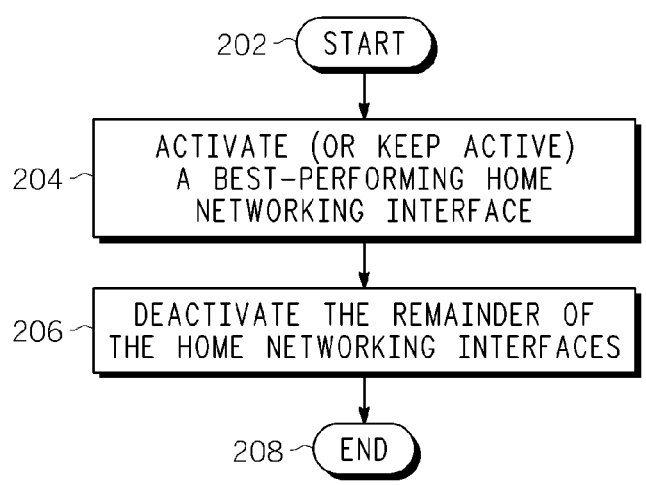
FIG. 2 is a flow diagram illustrating one embodiment of a method for selecting a home network interface.

FIG. 2 is a flow diagram illustrating one embodiment of a method 200 for selecting a home network interface. The method 200 may be implemented, for example, at a client STB having multiple home networking interfaces.

The method 200 is initialized at step 202 and proceeds to step 204, where the method 200 activates (or keeps active) the best performing home networking interface at the client STB. In one embodiment, the best performing home networking interface is identified in accordance with one or more configurable criteria, such as reliability, quality of service (QoS), capacity, throughput, or the like.

In step 206, the method 200 deactivates any remaining home networking interfaces at the client STB (i.e., other than the best-performing home networking interface) before terminating in step 208.

Figure 3:
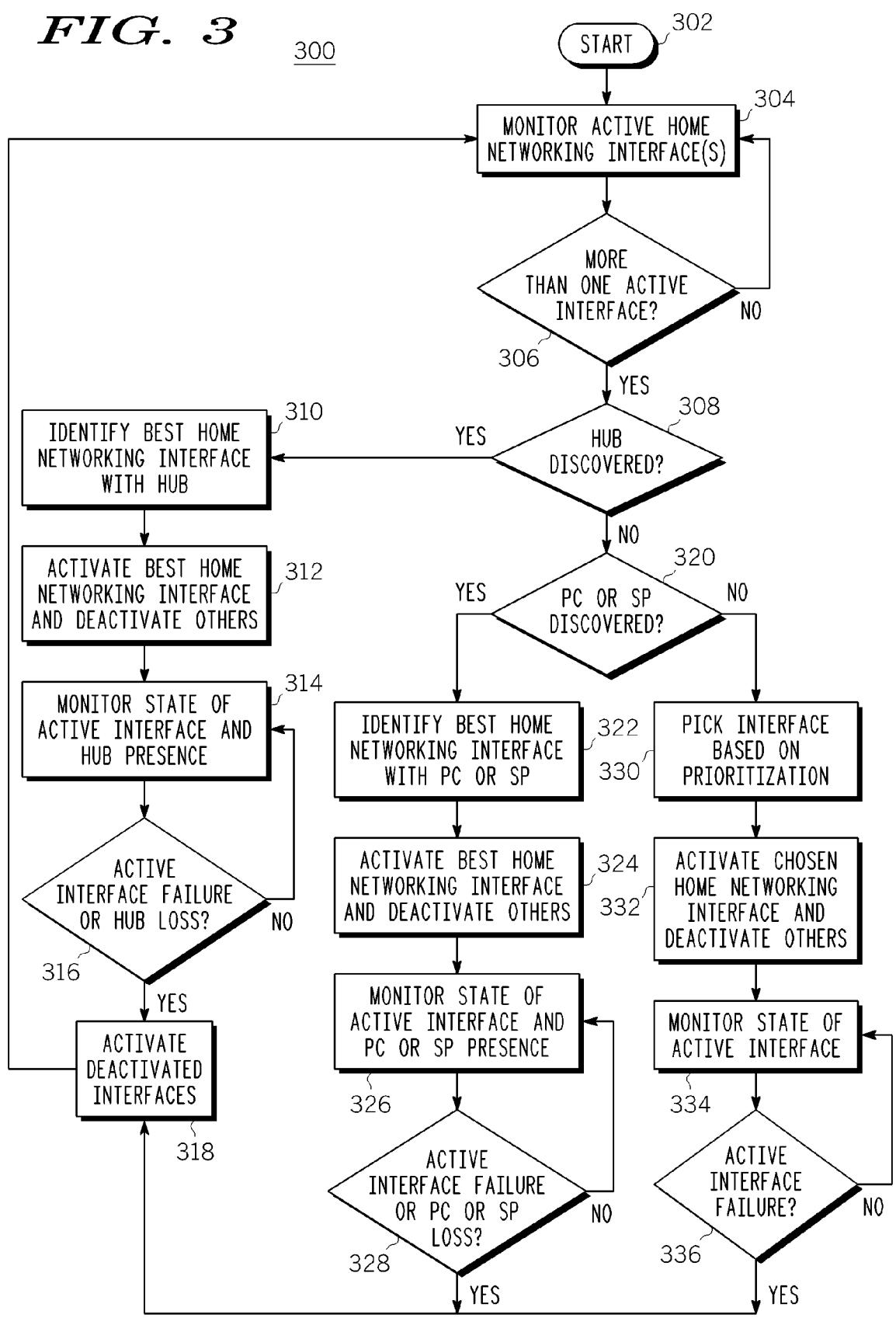
FIG. 3 is a flow diagram illustrating a more detailed embodiment of a method for selecting a home network interface.

FIG. 3 is a flow diagram illustrating a more detailed embodiment of a method 300 for selecting a home network interface. Like the method 200, the method 300 may be implemented, for example, at a client STB having multiple home networking interfaces. The method 300 provides additional detail beyond the high-level technique described with reference to FIG. 2.

The method 300 is initialized at step 302 and proceeds to step 304, where the method 300 monitors the active home networking interfaces at the client in which the method 300 is implemented. In step 306, the method 300 determines whether more than one home networking interface is active. If the method 300 concludes in step 306 that no more than one home networking interface is active, the method 300 returns to step 304 and proceeds as described above to monitor the active home networking interface.

Alternatively, if the method 300 concludes in step 306 that there is more than one active home networking interface, the method 300 proceeds to step 308 and determines if a hub STB can be discovered. Links from the client STB to a hub STB are considered to be more important than links from the client STB to other devices (e.g., home routers, home PCs, or the like). This is because one use case contemplated herein is for "whole home DVR service", where AV content is streamed from a hub STB DVR to a client STB on demand. In this case, one would want to select the initially active home networking interface with the best communication performance to the hub to remain active. In one embodiment, discovery of a hub STB involves implementation of the Universal Plug and Play (UPnP) discovery protocol. In this case, the method 300 would initiate a discovery message and then wait for a response from at least one hub STB. A hub STB will typically respond to any discovery message that it "hears" with an advertisement message that indicates the hub STB's presence. In some cases, a series of discovery messages may need to be initiated in order to discover a hub STB, but the number of discovery messages in the series must be limited so that the method 300 can determine if a hub STB has responded within a reasonably short period.

If the method 300 concludes in step 308 that a hub STB has been discovered, the method 300 proceeds to step 310 and identifies the best-performing home networking interface with the hub. In one embodiment, the determination as to which home networking interface is the best performing may be made in accordance with any one or more of a number of techniques. For example, in one embodiment, the home networking interface that exhibits the best overall performance relative to one or more metrics is selected. Another embodiment of a method for performance testing of home networking interfaces is described in further detail with respect to FIG. 4.

It is to be noted that any method for determining the best performing home networking interface is potentially disruptive to network performance. Thus, the selection of a method for identifying the best performing home networking interface should weigh the level of disruption against the accuracy of the method. There are different levels of test optimality and disruptiveness. For example, a very disruptive approach would be to test each initially active home networking interface individually before selecting the best performing home networking interface. It is assumed that this approach would be disruptive because it would require high priority, high data rate traffic to be sent for some period of time in order to obtain useful performance statistics. A very undisruptive approach would be to prioritize the home networking interfaces and simply select the initially active home networking interface with the highest priority. This approach would avoid disrupting data traffic, but is less optimal as it does not involve any test measurements. An approach that balances disruption and optimality more evenly might prioritize the home networking interfaces, set a threshold of acceptance, and then test the initially active home networking interfaces in order of highest priority. The first tested home networking interface to meet the threshold of acceptance is then selected. This approach is described in more detail with respect to FIG. 5.

Once the best-performing home networking interface has been selected, the method 300 proceeds to step 312 and deactivates all home networking interfaces at the client STB, except for the home networking interface identified in step 310 (which, if not already activated, is also activated in step 312).

In step 314, the method 300 monitors the state of the active home networking interface and for the continued ability to reach the hub STB. If the method 300 determines in step 316 that the active home networking interface has not failed and that the hub STB connectivity has not been lost, the method 300 returns to step 314 and continues to monitor the state of the active home networking interface and for the continued ability to reach the hub STB.

Alternatively, if the method 300 concludes in step 316 that the active home networking interface has failed and/or the hub STB connectivity has been lost, the method 300 proceeds to step 318 and activates the home networking interfaces that were deactivated in step 310 before returning to step 304 and proceeding as described above to re-initiate the interface discovery/selection process.

Referring back to step 308, if the method 300 determines that a hub STB is not present, the method 300 proceeds to step 320 and monitors the network for the presence of a personal computer (PC) and/or an Internet service platform (SP). In one embodiment, monitoring of a PC involves implementing UPnP in order to discover the PC (e.g., in a manner similar to that used for discovering hub STBs). In one embodiment, monitoring of an SP involves sending queries to the known address of an SP. If the method 300 determines in step 320 that a PC and/or SP is detected, the method 300 proceeds to step 322 and identifies a new home networking interface that is best performing with the PC or SP. In one embodiment, because the need to test the home networking interfaces for the best performing one could potentially be disruptive to network performance, step 322 is postponed (e.g., to an off-peak time period in which the network is not expected to experience heavy use), as long as immediate communication with a PC or SP is not essential. The testing can be postponed because the links from the client STB to a home router or PC are considered less critical than the links from the client STB to the hub STB. Streaming of AV content between the client STB and a PC is a helpful use case, but is considered less important than providing optimized hub-to-client AV streaming performance when a hub STB is available.

In step 324, the method deactivates all home networking interfaces at the client STB, except for the home networking interface identified in step 322, and then proceeds to step 326 to monitor the active home networking interface and for connectivity to the PC or SP. If the method 300 determines in step 328 that the active home networking interface has not failed and that the PC or SP connectivity has not been lost, the method 300 returns to step 326 and continues to monitor the active home networking interface and for the continued ability to reach the PC or SP.

Alternatively, if the method 300 concludes in step 328 that the active home networking interface has failed and/or the PC or SP connectivity has been lost, the method 300 proceeds to step 318 and proceeds as described above to activate the deactivated home networking interfaces in preparation for re-initiation of the interface discovery/selection process.

Referring back to step 320, if the method 300 concludes that a PC or an SP is not present, the method 300 proceeds to step 330 and selects a home networking interface based on a default prioritization. The method 300 then proceeds to step 332 and deactivates all home networking interfaces except for the selected one. In step 334, the state of the active home networking interface is monitored. If the method 300 concludes in step 336 that the active home networking interface has not failed, the method 300 returns to step 334 and continues to monitor the state of the active home networking interface.

Alternatively, if the method 300 determines in step 336 that the active home networking interface has failed, the method 300 proceeds to step 318 and activates all of the deactivated interfaces in preparation for re-initiation of the interface discovery/selection process.

Figure 4:
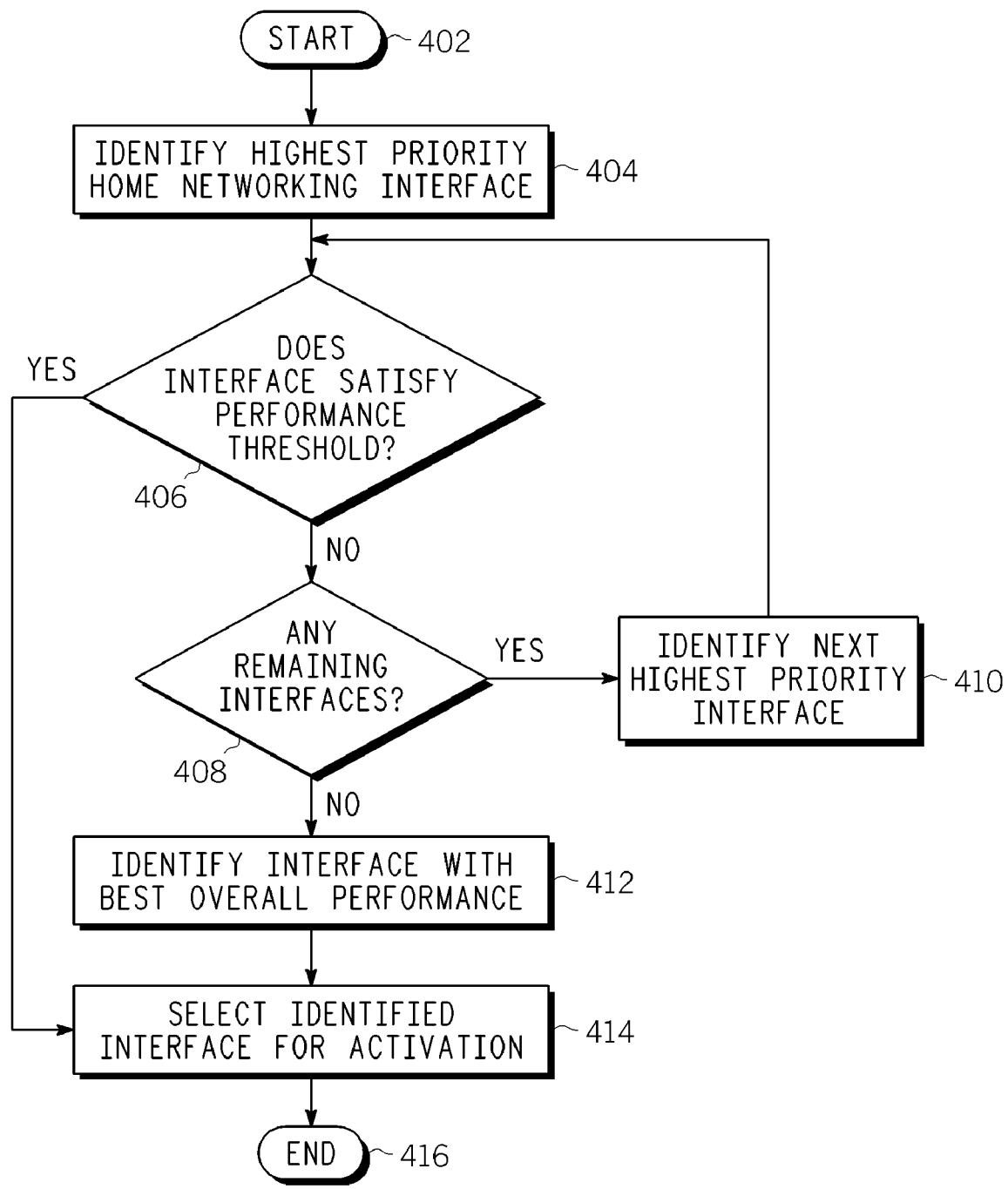
FIG. 4 is a flow diagram illustrating one embodiment of a method for performance testing of home networking interfaces at a client STB.

FIG. 4 is a flow diagram illustrating one embodiment of a method 400 for performance testing of home networking interfaces at a client STB. The method 400 may be implemented, for example, in accordance with step 310 of the method 300 in order to identify a best-performing home networking interface from among a plurality of candidate home networking interfaces to a hub STB. The method 400 identifies the best home networking interface to activate on a client STB in the presence of a hub STB.

The method 400 is initialized at step 402 and proceeds to step 404, where the method 400 identifies the highest-priority candidate home networking interface. In one embodiment, the home networking interfaces are prioritized according to one or more configurable criteria, such as reliability, quality of service (QoS), capacity or the like.

In step 406, the method 400 determines whether the identified home networking interface satisfies a performance threshold (e.g., minimum reliability, minimum QoS or the like). In one embodiment, the performance threshold is set to a value that relates to the client STB's maximum supported audio/visual (AV) streaming. In one embodiment, testing the identified home networking interface against the performance threshold involves requesting that a hub STB send a burst of traffic at a maximum target level (e.g., 20 Mbps for one high-definition Moving Picture Experts Group (MPEG) 2 AV stream). Following the testing, the hub STB also provides the client STB with transmit statistics (e.g., number of transmitted bits, octets or packets) that (along with other statistics collected and derived by the client STB, such as received bits, octets or packets or average delay and jitter) allow the client STB to quantify the connection performance. This procedure further involves deactivating any home networking interfaces not currently being tested, and assigning the test traffic a high priority (so that the test traffic is not disrupted by background traffic, such as an Internet file transfer to a hub STB). In one embodiment, the target level of traffic is configurable.

In some cases, a given home networking interface may not be capable of reaching a hub STB. In such an instance, no performance or transmit statistics can be recorded, and the home networking interface will thus not satisfy the performance threshold. It is also possible that a direct path from the client STB to a home router is not available. In this case, it is assumed that, if a hub STB is present, the hub STB provides the client STB with an adequate communication path to the home router (and home personal computer (PC) and greater Internet service platform (SP), if present).

If the method 400 concludes in step 406 that the identified home networking interface satisfies the performance threshold, the method 400 proceeds to step 414 and selects the identified home networking interface for activation before terminating in step 416.

Alternatively, if the method 400 determines in step 406 that the identified home networking interfaces does not satisfy the performance threshold, the method 400 proceeds to step 408 and determines whether there are any remaining candidate home networking interfaces. If the method 400 concludes in step 408 there is at least one other home networking interface remaining to be tested, the method 400 proceeds to step 410 and identifies the next highest priority home networking interface before returning to step 406 and proceeding as described above to test the identified home networking interface against the performance threshold.

Alternatively, if the method 400 concludes in step 408 that no home networking interfaces remain to be tested, the method 400 proceeds to step 412 and identifies the best overall performing home networking interface based on previously collected test results before proceeding to step 414 and selecting the identified home networking interface for activation, as described above.

If the active home networking interface is instead selected in accordance with the best overall performance, this method also involves receiving high priority test traffic and transmit statistics from a hub STB. Moreover, the home networking interfaces are also tested one at a time, with any home networking interfaces not currently being tested being deactivated.

A method similar to the method 400 may be implemented to identify the best home networking interface to activate on a client STB when a hub STB is not present. However, in this case, the client STB communicates with a home PC or SP rather than with a hub STB. The method 400 may be implemented, for example, in accordance with step 322 of the method 300 in order to identify a best-performing home networking interface from among a plurality of candidate home networking interfaces to a PC or an SP. Thus, the test traffic and performance thresholds will vary depending on what traffic and traffic performance is required over the connection. For instance, PC and SP connections may only require a data connection for file transfer at 5 Mbps. In addition, in the case of a home PC, the PC must be loaded with a client test application. Alternatively, in the case of an SP, the SP must be available and dedicated for the testing.

Figure 5:
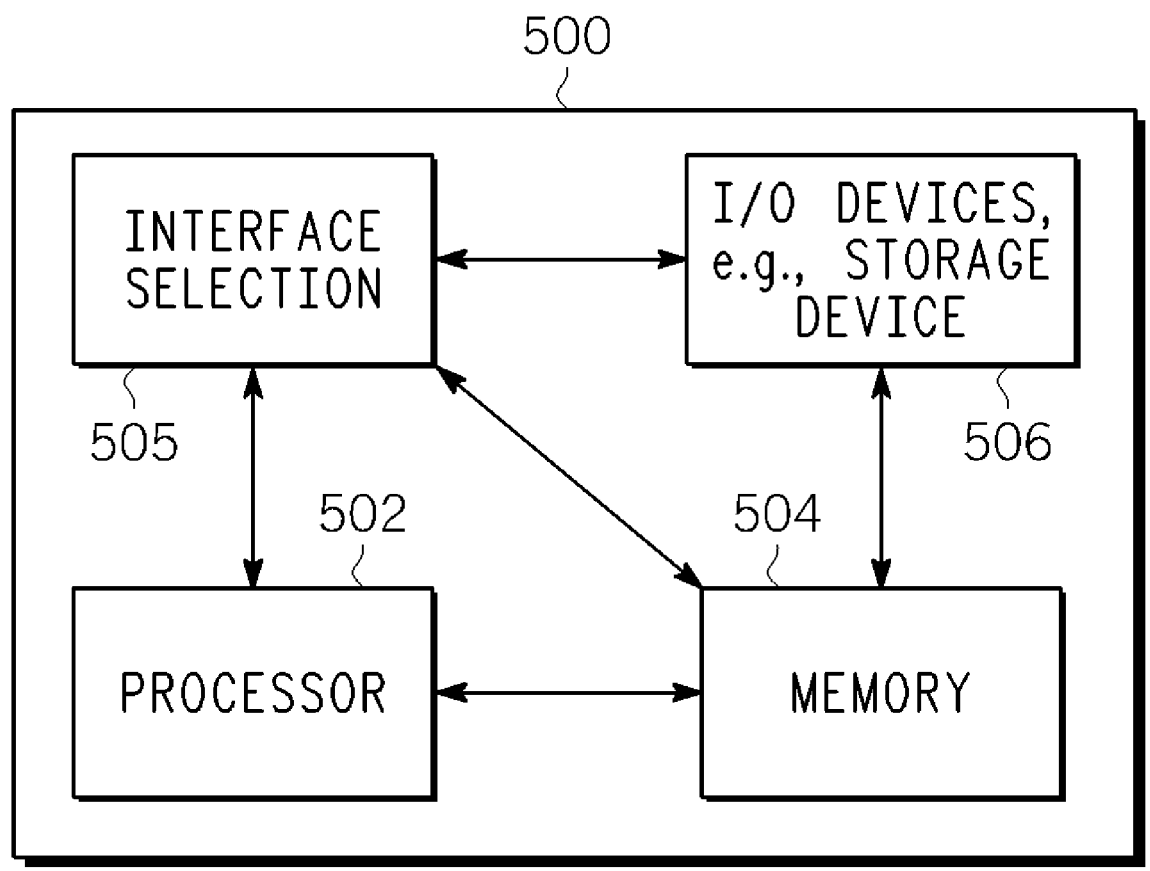
FIG. 5 is a high level block diagram of the present interface selection tool that is implemented using a general purpose computing device.

FIG. 5 is a high level block diagram of the present interface selection tool that is implemented using a general purpose computing device 500. In one embodiment, a general purpose computing device 500 comprises a processor 502, a memory 504, an interface selection module 505 and various input/output (I/O) devices 506 such as a display, a keyboard, a mouse, a modem, a network connection and the like. In one embodiment, at least one I/O device is a storage device (e.g., a disk drive, an optical disk drive, a floppy disk drive). It should be understood that the interface selection module 505 can be implemented as a physical device or subsystem that is coupled to a processor through a communication channel.

Alternatively, the interface selection module 505 can be represented by one or more software applications (or even a combination of software and hardware, e.g., using Field-Programmable Gate Arrays (FPGA)), where the software is loaded from a storage medium (e.g., I/O devices 506) and operated by the processor 502 in the memory 504 of the general purpose computing device 500. Additionally, the software may run in a distributed or partitioned fashion on two or more computing devices similar to the general purpose computing device 500. Thus, in one embodiment, the interface selection module 505 for selecting home networking interfaces in home networking applications described herein with reference to the preceding figures can be stored on a computer readable medium or carrier (e.g., RAM, magnetic or optical drive or diskette, and the like).

Thus, the present invention represents a significant advancement in the field of home networking applications. Embodiments of present invention allow for the selection of an active home networking interface at a client set top box from among a plurality of candidate home networking interfaces, where the selected home networking interface provides optimal performance relative to those home networking interfaces not selected.

While the foregoing is directed to embodiments of the invention, other and further embodiments of the invention may be devised without departing from the basic scope thereof.

What is claimed is:

1. A method for selecting an active home networking interface at a set top box in a network from among a plurality of home networking interfaces, the method comprising:
    detecting a change in a network architecture comprising the plurality of home networking interfaces;
    based on detecting the change, testing respective performances of each of the plurality of home networking interfaces in an order of priority until a home networking interface that satisfies a performance threshold is identified;
    activating the identified home networking interface; and
    deactivating a remainder of the plurality of home networking interfaces,
    wherein the testing comprises, for each of the plurality of home networking interfaces:
        activating a single one of the plurality of home networking interfaces;
        deactivating a remainder of the plurality of home networking interfaces; and
        measuring a performance of the single one of the plurality of home networking interfaces.

2. The method of claim 1, wherein the measuring comprises:
    receiving a burst of test traffic at a target level from a hub, a personal computer or an Internet service platform; and
    quantifying a connection performance relative to the hub, personal computer or Internet service platform.

3. The method of claim 2, wherein the quantifying is based on at least one transmit statistic comprising at least one of: a number of transmitted bits, a number of transmitted octets or a number of transmitted packets.

4. The method of claim 3, wherein the quantifying is further based on at least one of: a number of received bits, a number of received octets, a number of received packets, an average delay or an average jitter.

5. The method of claim 1, wherein the order of priority is based on at least one of: reliability, quality of service and capacity.

6. The method of claim 1, further comprising:
    monitoring a connection status of the identified home networking interface to a hub; and
    re-evaluating which of the plurality of home networking interfaces is satisfying the performance threshold, if a connection to the hub is lost.

7. The method of claim 1, further comprising:
    monitoring the network for a hub; and
    re-evaluating which of the plurality of home networking interfaces is satisfying the performance threshold, if a hub is detected.

8. The method of claim 1, further comprising:
    monitoring the identified home networking interface to a hub;
    activating the remainder of the plurality of home networking interfaces, if the identified home networking interface fails; and
    re-evaluating which of the plurality of home networking interfaces is satisfying the performance threshold.

9. A non-transitory computer readable medium containing an executable program for selecting an active home networking interface at a set top box in a network from among a plurality of home networking interfaces, where the program performs the steps of:
    detecting a change in a network architecture comprising the plurality of home networking interfaces;
    based on detecting the change, testing respective performances of each of the plurality of home networking interfaces in an order of priority until a home networking interface that satisfies a performance threshold is identified;
    activating the identified home networking interface; and
    deactivating a remainder of the plurality of home networking interfaces,
    wherein the testing comprises, for each of the plurality of home networking interfaces:
        activating a single one of the plurality of home networking interfaces;
        deactivating a remainder of the plurality of home networking interfaces; and
        measuring a performance of the single one of the plurality of home networking interfaces.

10. The computer readable medium of claim 9, wherein the measuring comprises:
    receiving a burst of test traffic at a target level from a hub, a personal computer or an Internet service platform; and
    quantifying a connection performance relative to the hub, personal computer or Internet service platform.

11. The computer readable medium of claim 10, wherein the quantifying is based on at least one transmit statistic comprising at least one of: a number of transmitted bits, a number of transmitted octets or a number of transmitted packets.

12. The computer readable medium of claim 11, wherein the quantifying is further based on at least one of: a number of received bits, a number of received octets, a number of received packets, an average delay or an average jitter.

13. The computer readable medium of claim 9, further comprising:
    monitoring a connection status of the identified home networking interface to a hub; and
    re-evaluating which of the plurality of home networking interfaces is satisfying the performance threshold, if a connection to the hub is lost.

14. The computer readable medium of claim 9, further comprising:
    monitoring the network for a hub; and
    re-evaluating which of the plurality of home networking interfaces is satisfying the performance threshold, if a hub is detected.

15. A system for selecting an active home networking interface at a set top box in a network from among a plurality of home networking interfaces, the system comprising:

an interface selection module configured:
- to detect a change in a network architecture comprising the plurality of home networking interfaces;
- to test, based on detecting the change, respective performances of each of the plurality of home networking interfaces in an order of priority until a home networking interface that satisfies a performance threshold is identified;
- to activate the identified home networking interface; and
- to deactivate a remainder of the plurality of home networking interfaces, wherein the testing comprises, for each of the plurality of home networking interfaces:
- activating a single one of the plurality of home networking interfaces;
- deactivating a remainder of the plurality of home networking interfaces; and
- measuring a performance of the single one of the plurality of home networking interfaces.

\* \* \* \* \*